(12) United States Patent
Gretz

(10) Patent No.: US 11,239,643 B1
(45) Date of Patent: Feb. 1, 2022

(54) RECESSED FLOORBOX KIT WITH KEYSTONE HOLDER

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 317 days.

(21) Appl. No.: 16/391,793

(22) Filed: Apr. 23, 2019

Related U.S. Application Data

(60) Provisional application No. 62/662,886, filed on Apr. 26, 2018.

(51) Int. Cl.
*H02G 3/18* (2006.01)
*H02G 3/14* (2006.01)
*H02G 3/12* (2006.01)
*H02G 3/08* (2006.01)

(52) U.S. Cl.
CPC ............... *H02G 3/185* (2013.01); *H02G 3/14* (2013.01); *H02G 3/08* (2013.01); *H02G 3/081* (2013.01); *H02G 3/12* (2013.01)

(58) Field of Classification Search
CPC .......... H02G 3/08; H02G 3/081; H02G 3/083; H02G 3/088; H02G 3/10; H02G 3/12; H02G 3/121; H02G 3/123; H02G 3/185; H02G 3/14; H01R 13/46; H01R 13/52; H05K 5/00; H05K 5/02; H05K 5/03; H05K 5/0247; H05K 5/0213

USPC ........ 174/480, 481, 483, 54, 482, 484, 490, 174/494, 488, 487, 50, 53, 57, 535; 220/3.2–3.9, 4.02; 52/220.3, 220.7, 52/220.1, 220.8
See application file for complete search history.

(56) References Cited

U.S. PATENT DOCUMENTS

| | | |
|---|---|---|
| 5,272,278 A | 12/1993 | Wuertz |
| 5,466,886 A | 11/1995 | Lengyel et al. |
| 5,783,774 A | 7/1998 | Bowman et al. |
| 6,179,634 B1 | 1/2001 | Hull et al. |
| 6,417,446 B1 * | 7/2002 | Whitehead ............ H02G 3/185 174/484 |
| 7,064,268 B2 * | 6/2006 | Dinh ...................... H02G 3/185 174/485 |
| 7,795,544 B2 | 9/2010 | Peck |
| 8,273,998 B2 | 9/2012 | Drane |
| 8,759,676 B1 | 6/2014 | Gretz |
| 8,921,712 B1 | 12/2014 | Gretz |

(Continued)

*Primary Examiner* — Angel R Estrada

(57) ABSTRACT

A kit for recessed mounting of one or more electrical components within an electrical floor box. The kit includes a leveling ring for mounting an electrical component within the floor box, a funnel with a keystone opening therein, a trim ring with a recessed surface, a cover, and an optional divider for dividing the electrical floor box into high and low voltage compartments. A keystone opening on the funnel provides access to a low voltage holder. The low voltage holder includes a pocket to accommodate snap-in mounting of a low voltage component therein. The leveling ring enables leveling the electrical component with the floor surface. Fasteners secure the trim ring to the funnel and the leveling ring. Securing the cover to the recessed surface of the trim ring provides a recessed floor box assembly with the cover recessed below the floor surface.

11 Claims, 9 Drawing Sheets

(56) References Cited

U.S. PATENT DOCUMENTS

| | | | |
|---|---|---|---|
| 9,148,007 B2 * | 9/2015 | Drane | H02G 3/185 |
| 9,667,049 B1 | 5/2017 | Gretz | |
| 9,735,558 B1 * | 8/2017 | Gretz | H02G 3/14 |
| 9,831,648 B1 | 11/2017 | Gretz | |
| 10,283,951 B1 * | 5/2019 | Gretz | H02G 3/185 |
| 10,530,140 B2 * | 1/2020 | Drane | H02G 3/081 |
| 11,050,228 B2 * | 6/2021 | Byrne | H02G 3/14 |
| 11,088,523 B1 * | 8/2021 | Gretz | H02G 3/185 |

* cited by examiner

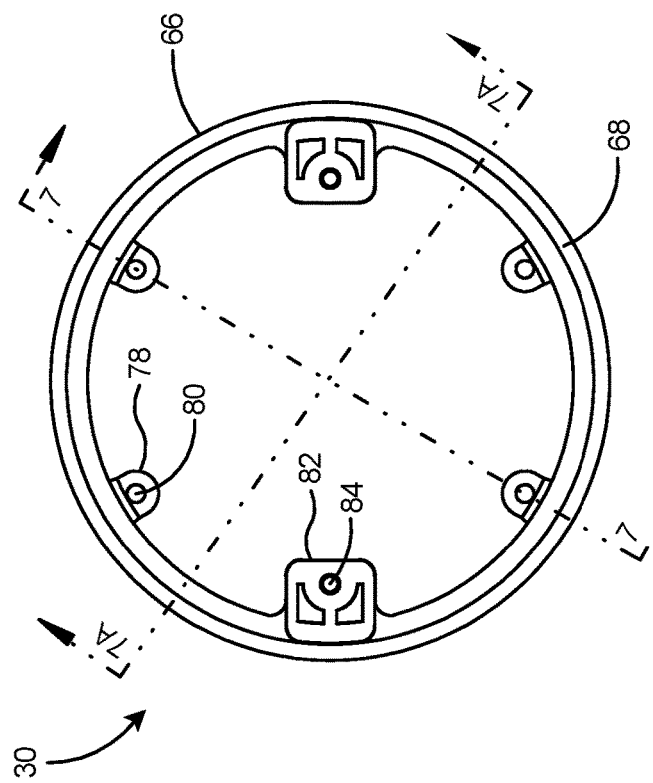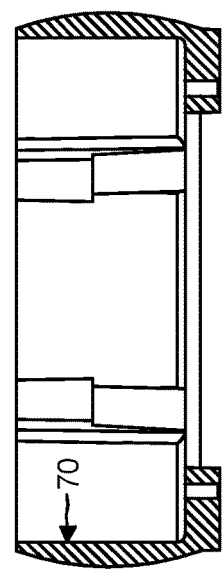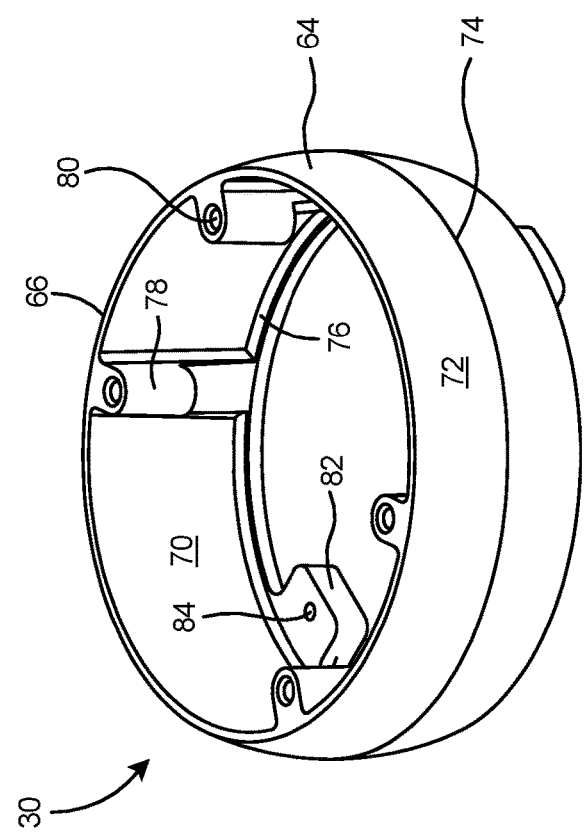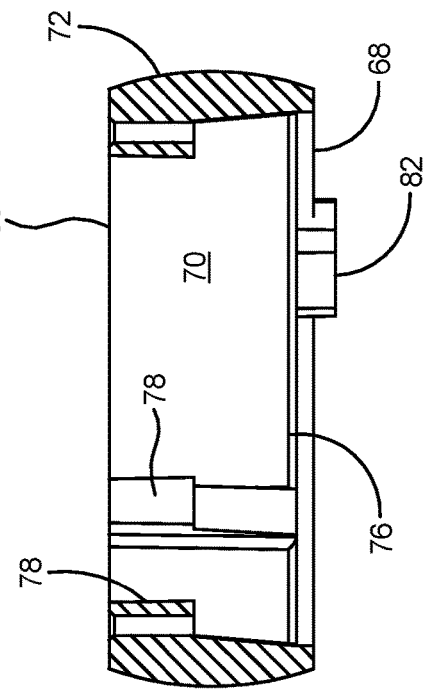

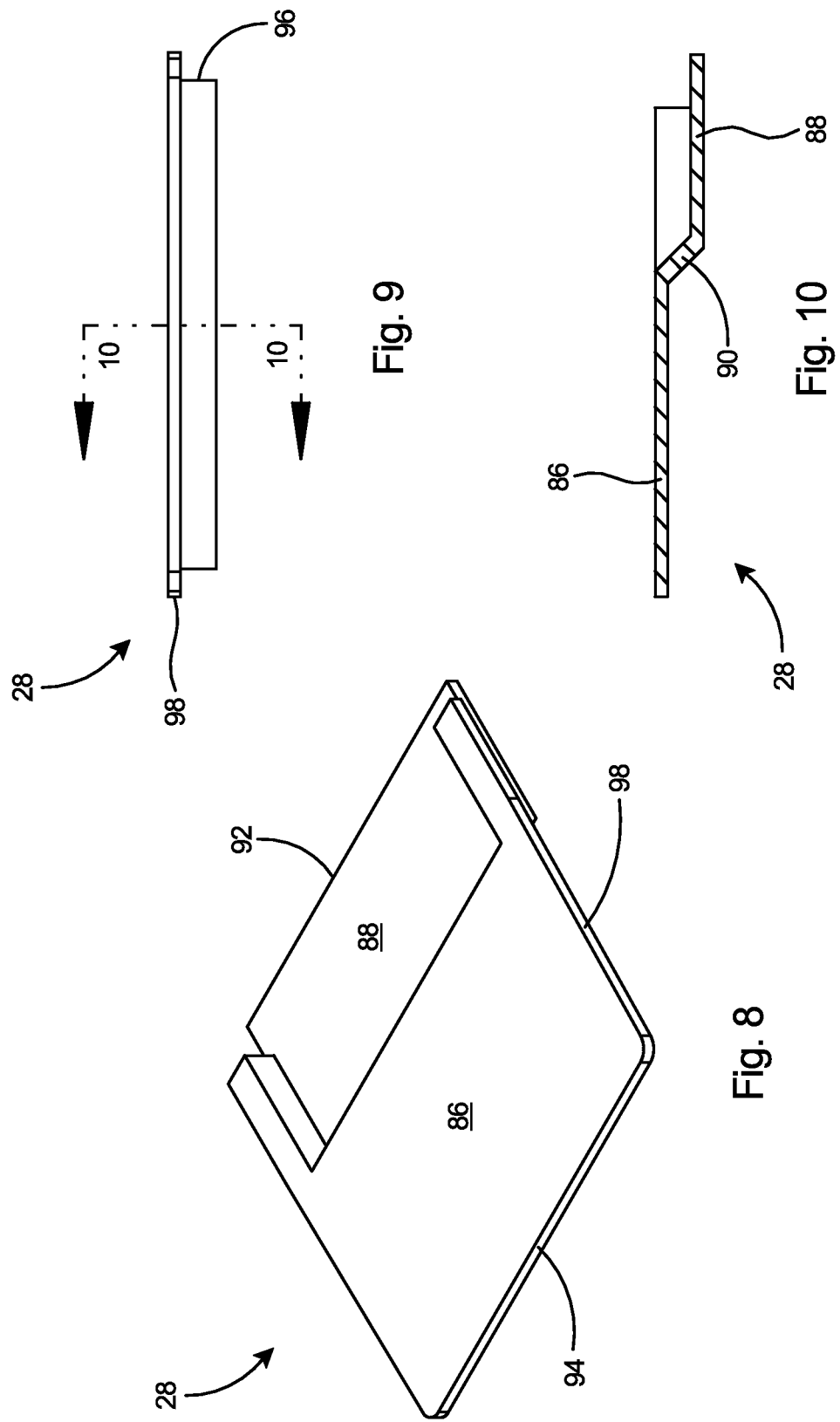

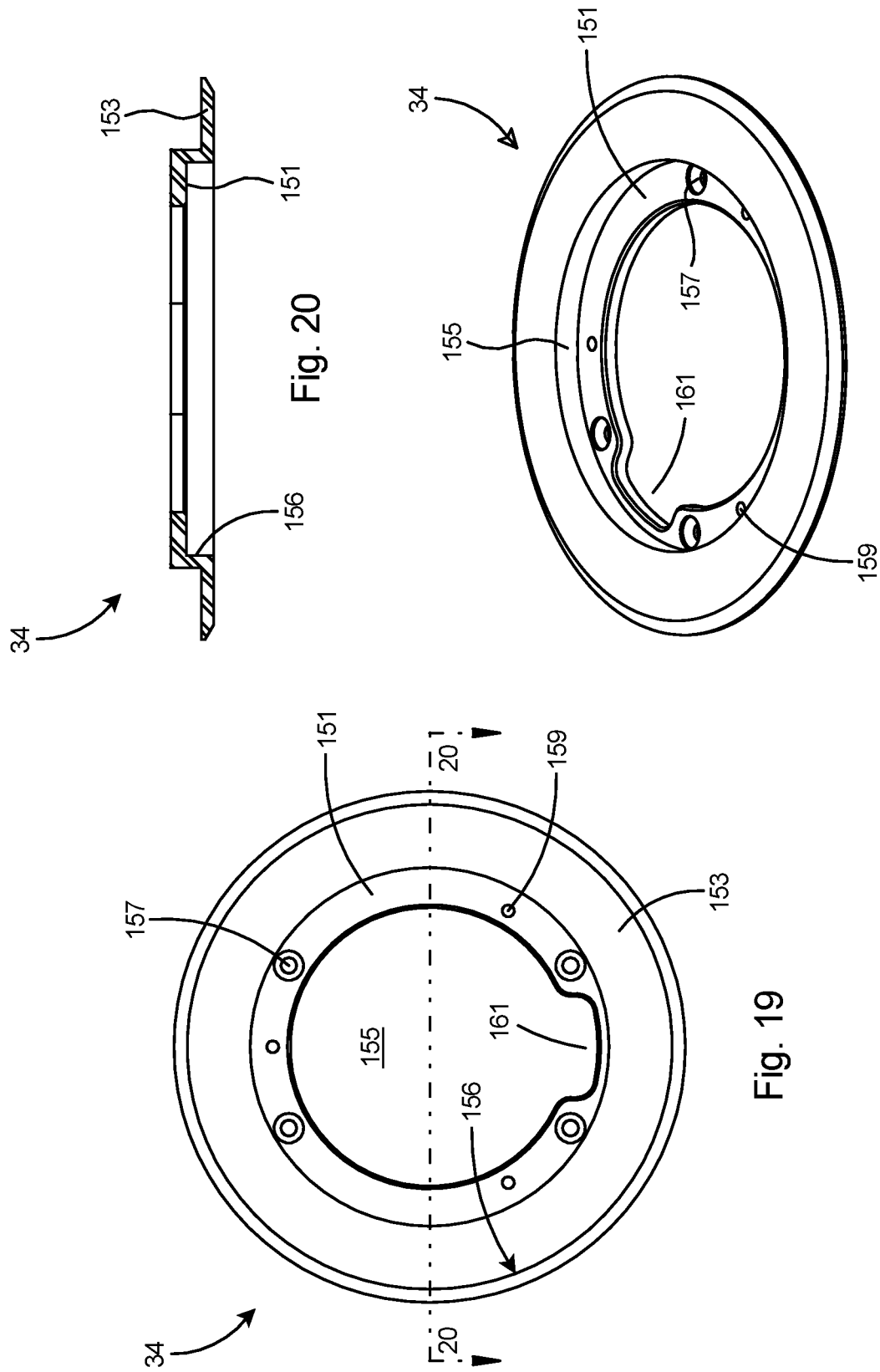

RECESSED FLOORBOX KIT WITH KEYSTONE HOLDER

CROSS-REFERENCE TO RELATED APPLICATIONS

This application claims the benefit of provisional U.S. Application No. 62/662,886, filed Apr. 26, 2018, the contents of which is incorporated herein in its entirety.

FIELD OF THE INVENTION

This invention relates to electrical boxes and specifically to a kit for recessed mounting of one or more electrical components within an electrical floor box.

BACKGROUND OF THE INVENTION

Homeowners often require access to both high and low voltage electrical service in a concrete pour area, such as commonly found in basements, garages, and the like. Boxes for concrete pours are typically placed within the forms that will receive the concrete pour, the concrete is poured around the electrical box, and, after the concrete cures, one or more electrical components are mounted within the box.

Although various boxes have been proposed for concrete pours, they typically do not enable easy mounting of both high and low voltage components therein. Although an arrangement may be included for mounting of a high voltage component, such as a duplex receptacle for providing a plug-in for electrical service, there typically is no arrangement within the box to enable easy mounting of a low voltage jack or connector, such as a USB port, an HDMI® jack, Ethernet jack, or connector jack for surround sound.

What is needed therefore is an improved electrical floor box for concrete pours that enables secure and simple mounting of both high and low voltage electrical devices, enables mounting of a wide range of electrical covers, and eliminates the use of clips and adhesive for leveling the electrical components within the box.

BRIEF SUMMARY OF THE INVENTION

The present invention is a kit for recessed mounting of one or more electrical components within an electrical floor box. The kit includes a leveling ring with bosses, a funnel with a keystone opening therein, a trim ring with a recessed surface, and a cover. An optional low voltage divider provides a means of dividing the inner enclosure of the electrical floor box into low and high voltage compartments. The leveling ring provides a means of mounting and leveling an electrical component within the can. The funnel includes a keystone opening for enabling snap-in connection of a low voltage holder. A flange on the funnel facilitates mounting to the leveling ring. The low voltage holder includes a pocket to accommodate mounting of a low voltage component therein. Fasteners may be driven through the recessed surface of the trim ring, through the funnel, and into the bosses of the leveling ring to secure the trim ring and funnel to the leveling ring. The cover can be nested within the trim ring to form a recessed floor box assembly with the cover and trim ring substantially flat with the floor surface to eliminate any tripping hazard.

OBJECTS AND ADVANTAGES

A first object of the invention is to provide an electrical floor box kit for mounting an electrical receptacle level with the floor surface.

A further object of the invention is to provide an electrical floor box kit that eliminates the need for clips for leveling an electrical component with respect to a floor surface.

Another object of the invention is to provide an electrical floor box kit that can be economically manufactured at low-cost.

Another object of the invention is to provide an electrical floor box kit that includes a while-in-use cover to enable connection of electrical cords to the electrical receptacle while the cover is closed.

A further object of the invention is to provide an electrical floor box kit that includes ultra-thin flanges for flush-to-the-floor installation.

Another object of the invention is to provide a cover is recessed within the electrical floor box to reduce the trip hazard caused by plugs sticking out of the box.

A further object of the invention is to provide an electrical floor box kit that includes a divider to enable the mounting of both power and low voltage in the same box.

A further object of the invention is to provide an electrical floor box kit that includes a low voltage keystone holder, which is a structure specifically configured to accept easy snap-in of a low voltage component such as a USB port, an HDMI® jack, Ethernet jack, or similar low voltage component.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 5 is an isometric view of a leveling ring that forms a portion of the recessed floor box of FIG. 1.

FIG. 6 is a plan view of the leveling ring.

FIG. 7 is a sectional view of the leveling ring taken along line 7-7 of FIG. 6.

FIG. 7A is a sectional view of the leveling ring taken along line 7A-7A of FIG. 6.

FIG. 8 is an isometric view of a voltage divider that forms a portion of the recessed floor box of FIG. 1.

FIG. 9 is a side view of the voltage divider.

FIG. 10 is a sectional view of the voltage divider taken along line 10-10 of FIG. 9.

FIG. 19 is a plan view of a trim ring that forms a portion of the recessed floor box of FIG. 1.

FIG. 20 is a sectional view of the trim ring taken along line 20-20 of FIG. 19.

FIG. 21 is a top isometric view of the trim ring.

DETAILED DESCRIPTION

Figure 1:
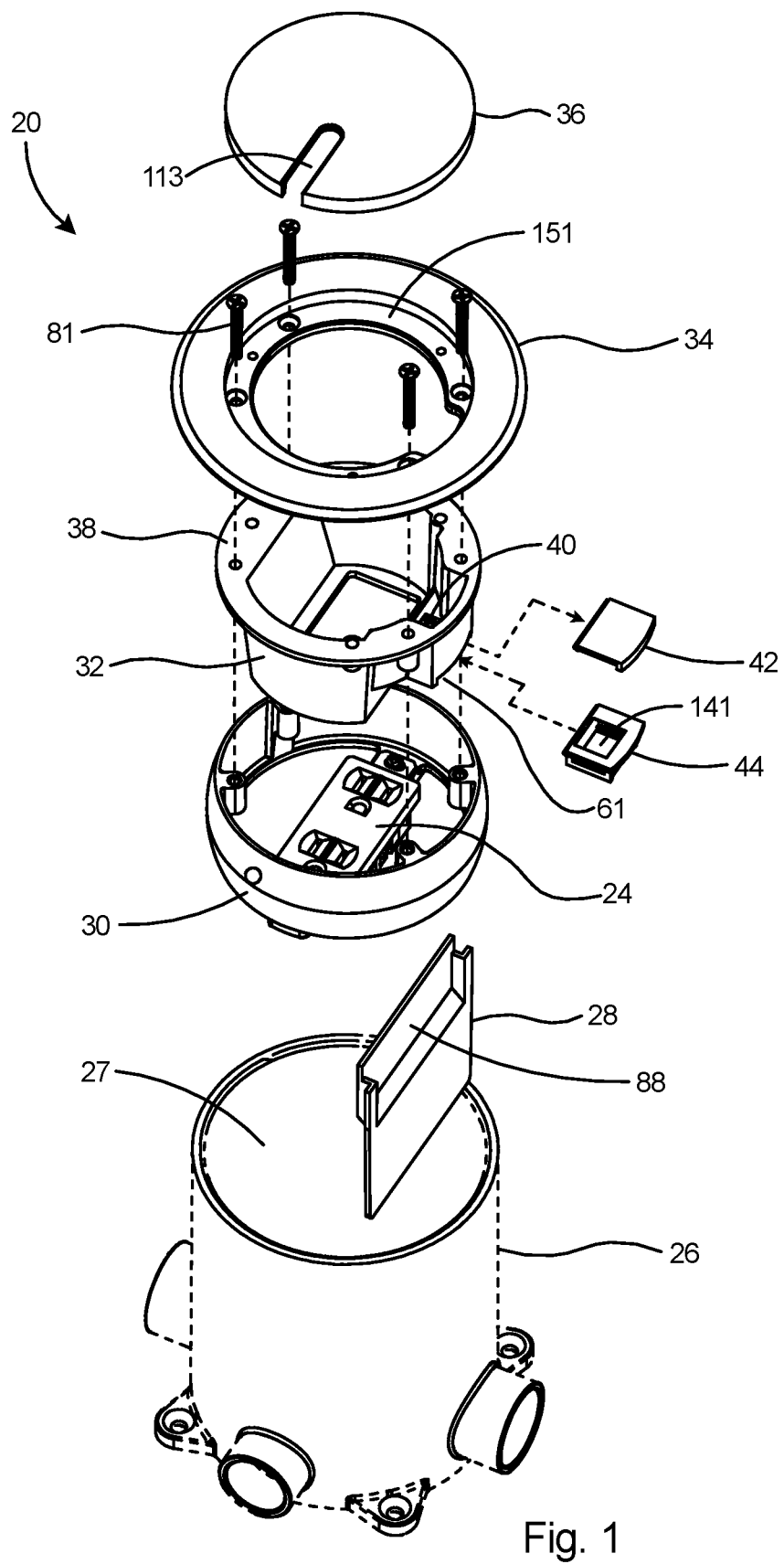
FIG. 1 is an exploded perspective view of a first embodiment of a recessed floor box with keystone holder according to the invention.

With reference to FIG. 1, the present invention is a recessed floor box kit 20 with keystone holder for mounting an electrical outlet 24 or other electrical component in a floor. The recessed floor box kit 20 includes electrical floor box 26 having an enclosure 27, an optional low voltage divider 28, a leveling ring 30, a funnel 32, a trim ring 34, and a cover 36. The funnel 32 includes a flange 38, a keystone opening 40 and a plug 42 closing the keystone opening 40, which plug 42 can be removed from the funnel 32 at the job site and replaced by a low voltage keystone holder 44. Low voltage keystone holder 44 is configured to accept a low voltage component such as a USB port, an HDMI® jack, Ethernet jack, or similar low voltage component.

Figure 3:
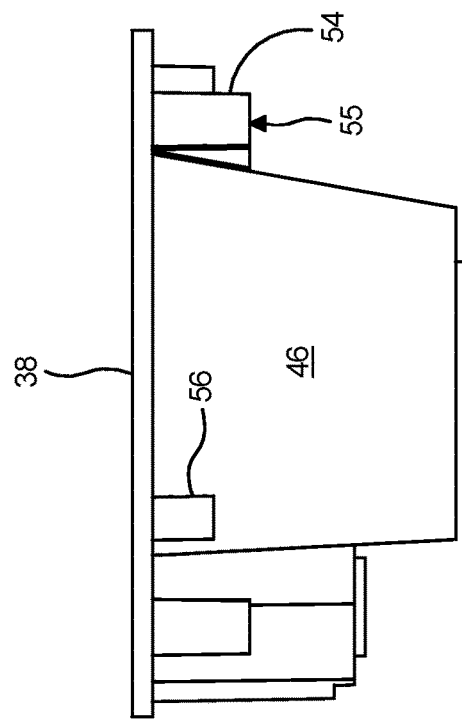
FIG. 3 is a side view of the funnel.
Figure 4:
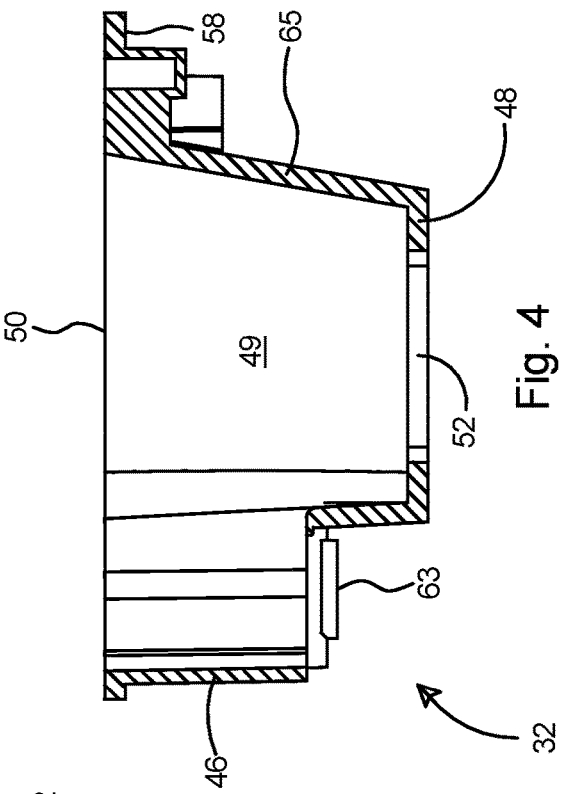
FIG. 4 is a sectional view of the funnel taken along line 4-4 of FIG. 2.
Figure 2:
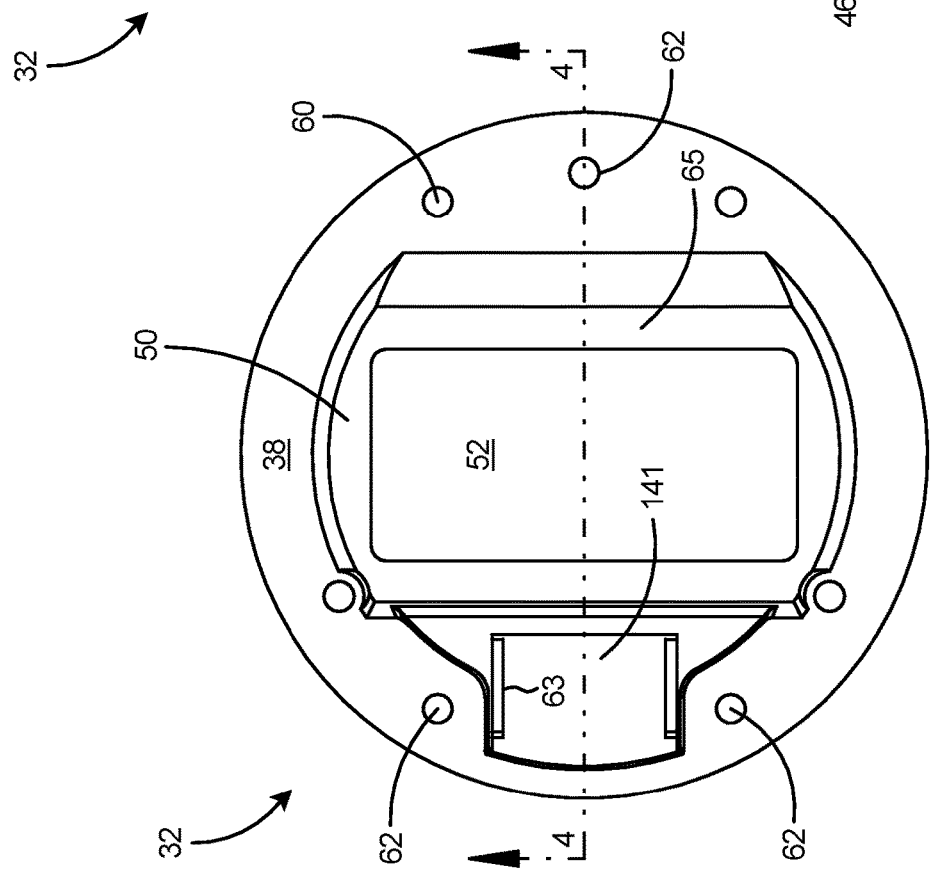
FIG. 2 is a side view of a funnel that forms a portion of the recessed floor box of FIG. 1.

Referring to FIGS. 2-4, the funnel 32 includes a first sidewall 46 and bottom wall 48 for forming the sides and bottom of a high voltage electrical enclosure 49. The funnel 32 further includes a top opening 50, a bottom opening 52, one or more long bosses 54, and one or more short bosses 56 extending from the bottom 58 of flange 38. Flange 38 includes bores 60 coaxial with and extending into long bosses 54 for securing the funnel 32 to the leveling ring 30 (see FIG. 1). Flange 38 further includes bores 62 coaxial with and extending into short bosses 56 for securing the trim ring 34 to the funnel 32 (see FIG. 1). The funnel 32 includes a pocket 141 that includes one or more rails 63 adapted to receive a low voltage component (not shown). The funnel 32 further includes a sloped sidewall 65 opposite the first sidewall 46, the sloped sidewall 65 sloping inward from the flange 58 toward the bottom wall 48.

With reference to FIGS. 5-7, the leveling ring 30 includes an annular body 64 with a top rim 66, a bottom rim 68, an inner periphery 70, and an arcuate outer periphery 72. Annular body 64 is at a maximum thickness at substantially the midpoint 74 between the top rim 66 and bottom rim 68. Leveling ring 30 includes a collar 76 extending around the inner periphery 70 at the bottom rim 68, one or more bosses 78 extending inward from the body 64 at the top rim 66, the bosses 78 including bores 80 therein for acceptance of fasteners 81 (see FIG. 1) for securing the funnel to the leveling ring 30. Leveling ring further includes one or more component attachment arms 82 with apertures 84 therein extending inward from the bottom rim 68. With reference to FIGS. 8-10, the low voltage divider 28 includes a plate-like body including a base portion 86, a top extension 88, and an angled portion 90 offsetting the top extension 88 from the base portion 86. Low voltage divider 28 includes a top 92, a bottom 94, and sides 96. The base portion 86 overlaps the extension forming a flange 98 extending outward from the sides 96.

Figure 12:
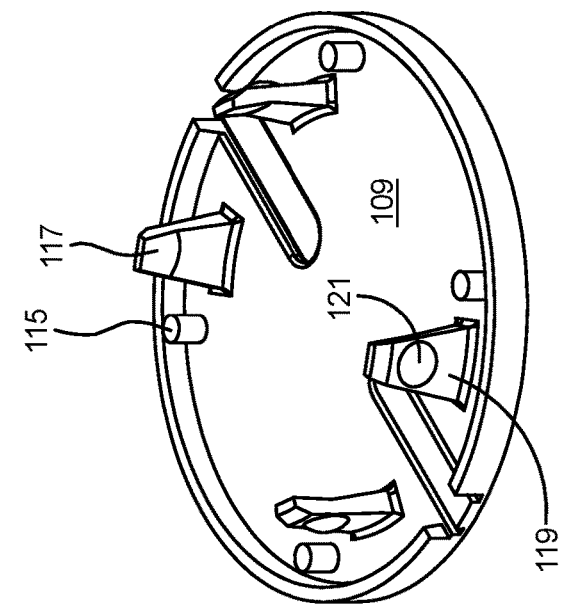
FIG. 12 is a bottom isometric view of the snap cap.
Figure 11:
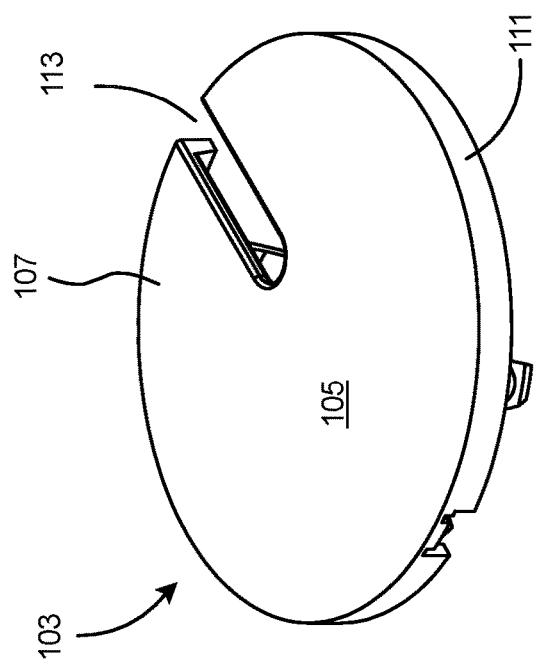
FIG. 11 is a top isometric view of a snap cap that forms a portion of the recessed floor box of FIG. 1.
Figure 13:
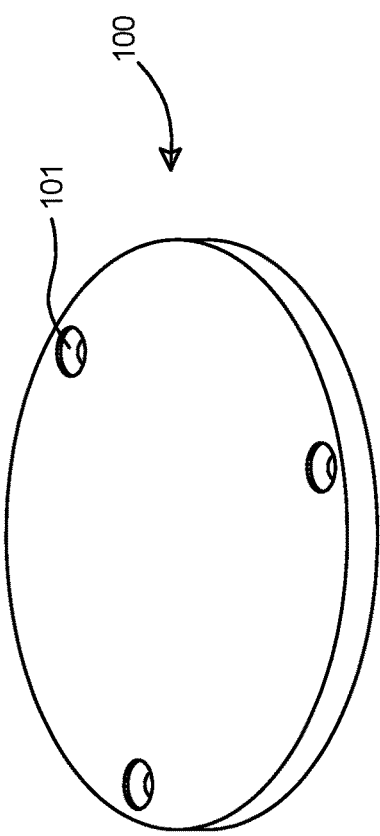
FIG. 13 is a top isometric view of a blank cover that forms a portion of the recessed floor box of FIG. 1.

Referring to FIG. 13, the cover can be a blank cover 100 such as shown in FIG. 13. The blank cover 100 includes one or more apertures 101 that can be axially aligned with the bores 62 in the trim ring 34 for closing the recessed floor box 26 (see FIG. 1). Alternatively, with reference to FIGS. 11 and 12, the cover 36 can be a snap cap for snap engagement with the trim ring. Snap cap 103 includes a substantially flat body 105 having a top 107, a recessed bottom 109, a downward-depending rim 111, and a one or more slots 113 therein. One or more posts 115 and a plurality of resilient legs 117 extend from the bottom 109 of the snap cap. Legs 117 are flexible and include outer surfaces 119 and rounded tabs 121 extending from the outer surfaces.

Figure 14:
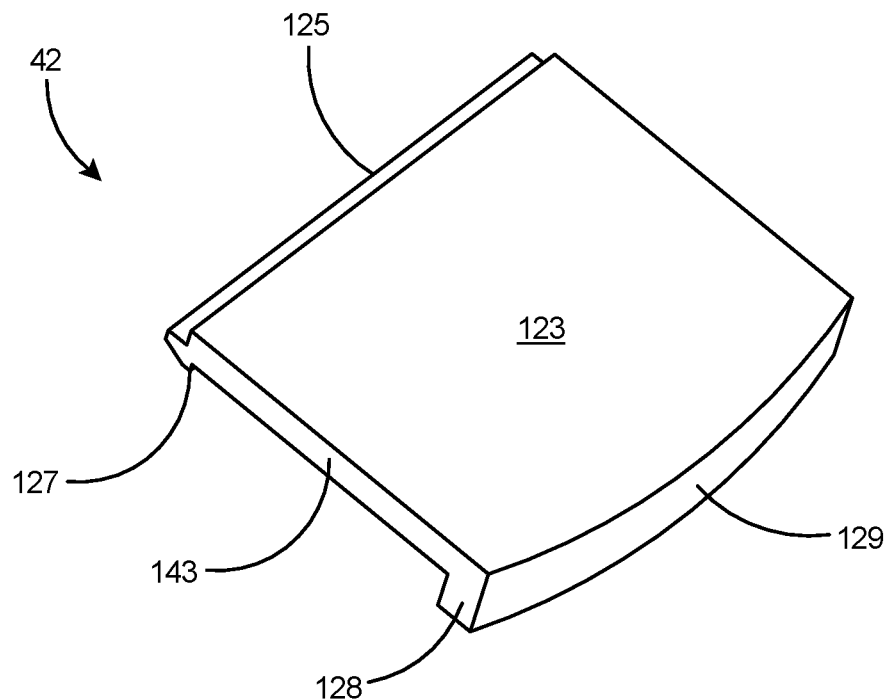
FIG. 14 is a top isometric view of a blank insert or plug that may form a portion of the recessed floor box of FIG. 1.

Referring to FIG. 14, the plug 42 includes a body 123, an inner end 125, a planar lip 127 on the inner end, an arcuate outer lip 128, and an arcuate outer face 129. As shown in FIG. 1, the plug 42 can be removed from the keystone opening 40 of the funnel 32 at the job site and replaced by a low voltage keystone holder 44.

Figure 15:
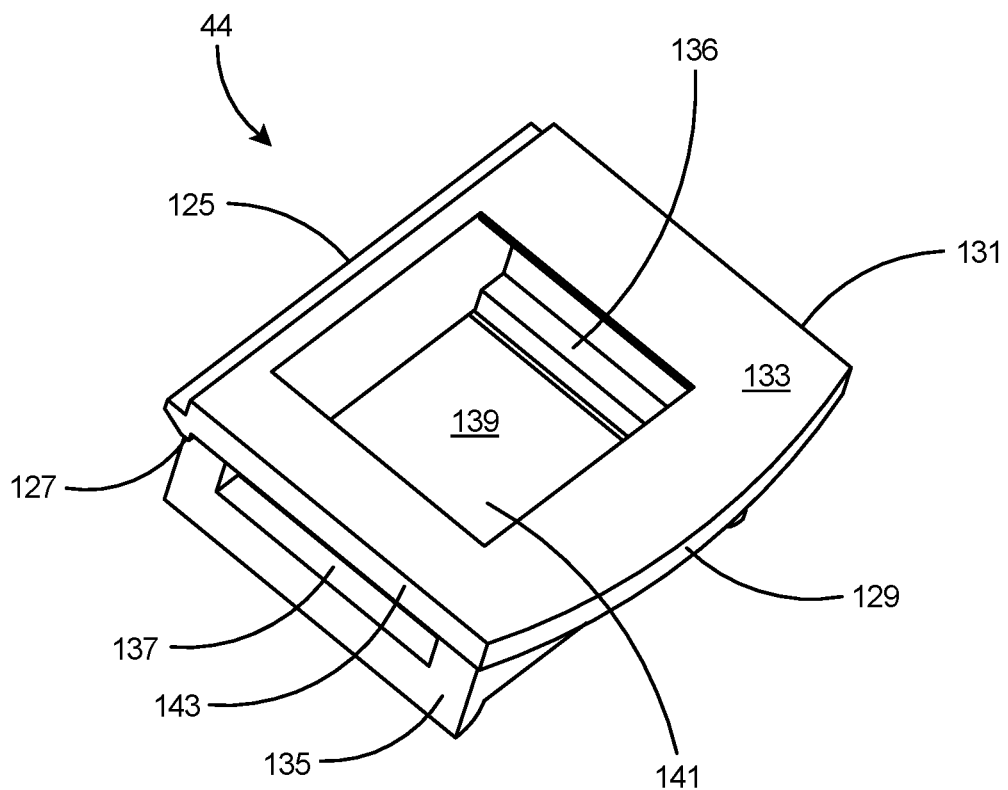
FIG. 15 is a top isometric view of a low voltage keystone insert that may form a portion of the recessed floor box of FIG. 1.

With reference to FIG. 15, the low voltage keystone holder 44 includes a body 131 having a top plate 133, an inner end 125, a planar lip 127 on the inner end, and an arcuate outer face 129. The low voltage keystone holder 44 further includes side walls 135 with a shelf 136, slots 137 in the side walls, a pocket opening 139, and a pocket 141 that is adapted to receive a low voltage (LV) component such as a USB port, an HDMI® jack, Ethernet jack, or similar low voltage component (not shown). A low voltage component can be pressed upward through the pocket opening 139 and within the pocket 141. Arms (not shown) on the LV component snap engage the shelf 136 of the low voltage keystone holder 44, after which the LV component is securely interlocked inside the pocket. The plug 42 and low voltage keystone holder 44 both include plate extensions 143, which in the low voltage keystone holder extend beyond the side walls 135.

Figure 16:
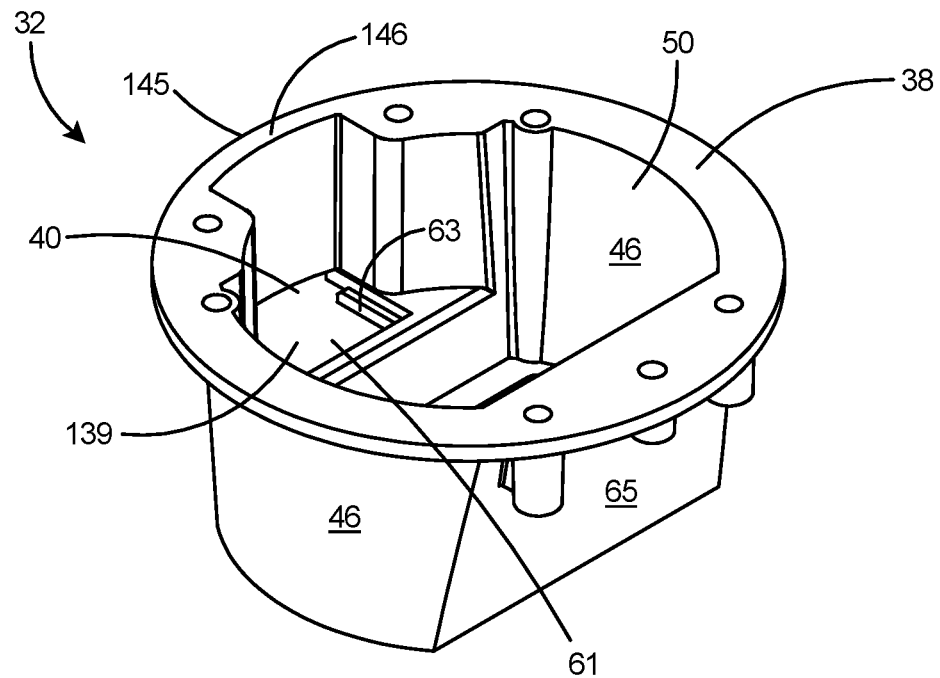
FIG. 16 is a top isometric view of the funnel.
Figure 17:
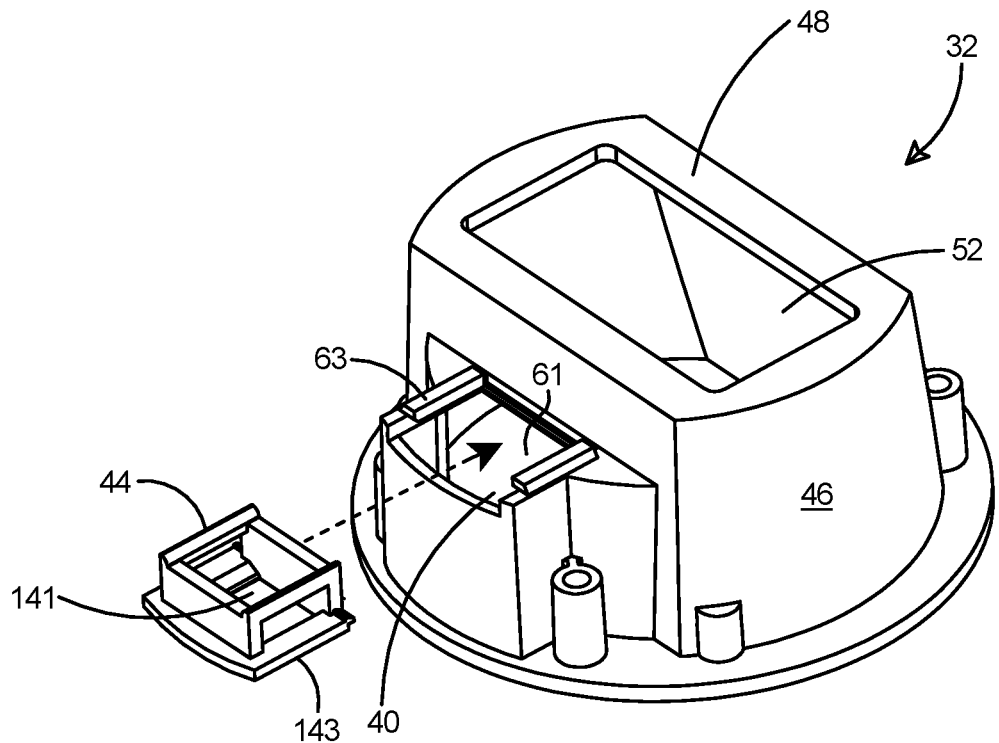
FIG. 17 is a bottom isometric view of the funnel and the keystone holder in alignment to be inserted into the funnel.

Referring to FIGS. 16 and 17, the funnel 32 includes the sidewalls 38, bottom opening 52, and the pocket opening 139 leading into the pocket 141. The funnel 32 includes a low voltage cavity 61 that includes the one or more rails 63 which are adapted to receive the plate extensions 143 of either the plug 42 or the low voltage keystone holder 44. FIG. 17 depicts insertion of the low voltage keystone holder 44 into the pocket 141. The funnel 32 includes a low voltage side 145 with a narrowed flange 146 leading into the low voltage cavity 61. The low voltage side 145 of the funnel 32 includes a sealing surface 144 that, when inserted into an electrical floor box, will mate with and bear against the top extension 88 (see FIG. 8) of the low voltage divider to provide a low voltage compartment within the electrical floor box. The funnel 32 includes the bottom opening 52 which accepts a high voltage component (not shown) therein. Opening 52 in bottom wall 48 is sized to snugly fit around the periphery of an electrical outlet 24 as shown in FIG. 1.

Figure 18:
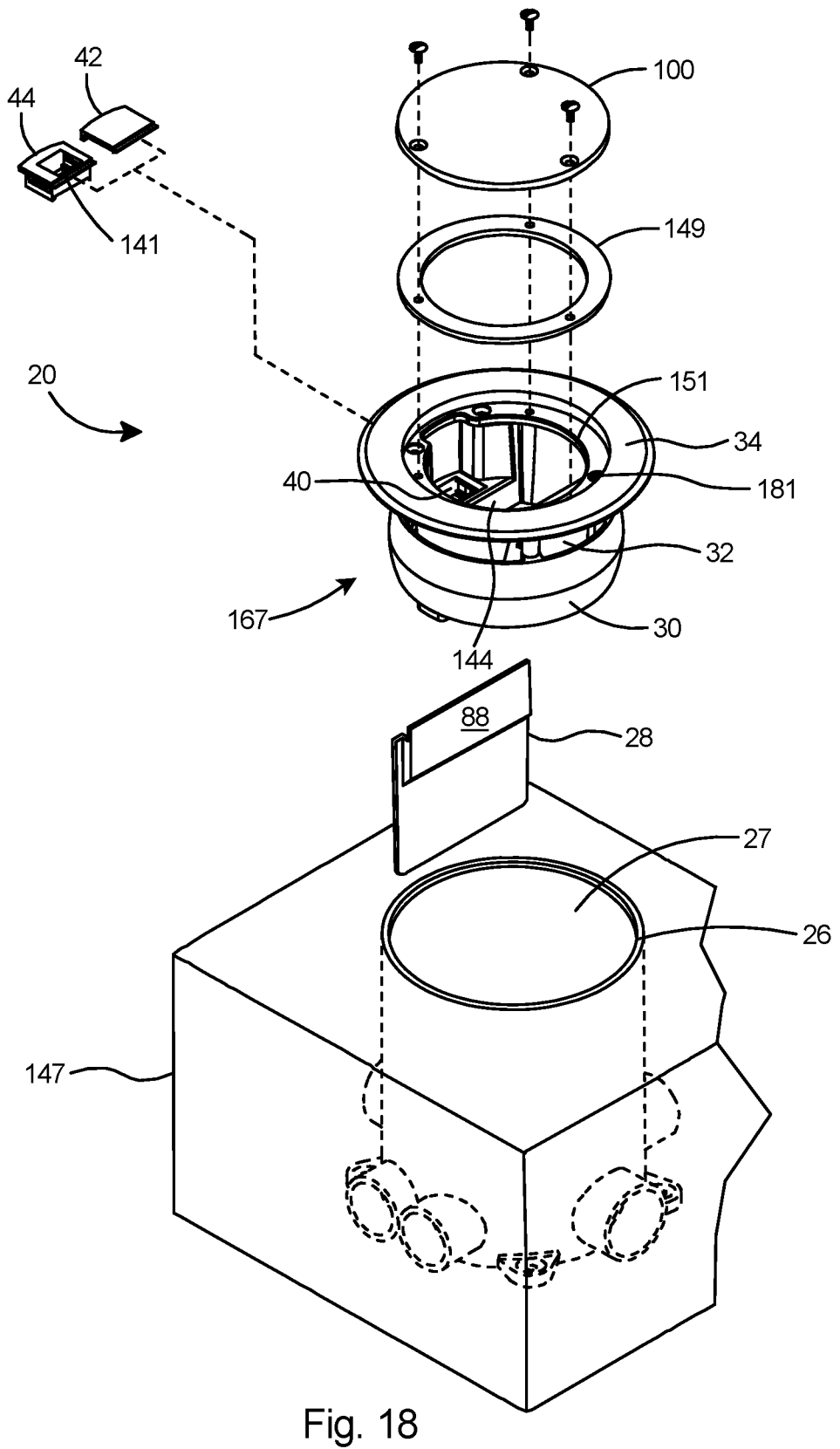
FIG. 18 is an exploded perspective view of the recessed floor box including a blank insert and low voltage keystone insert in alignment to be inserted into the keystone holder.

The trim ring 34, funnel 32, and leveling ring 30 assembly, when assembled together as shown in FIG. 18, is then inserted into the electrical floor box 26. A gasket 149 may be installed in the recessed surface 151 of the trim ring 34.

Referring to FIGS. 19-21, the trim ring 34 includes a flange 153, an opening 155, and a peripheral wall 156 extending from the flange 153 to the recessed surface 151. The recessed surface 151 includes one or more apertures 157 for accepting fasteners (not shown) for securing the trim ring 34 to the funnel and leveling ring to form the leveling ring 30 assembly. Additional apertures 159 are provided in the recessed surface 151 to accept fasteners for mounting a cover to the trim ring to form a recessed floor box assembly according to the invention. A cut-out area 161 is provided in the recessed surface 151 of the trim ring 34 to enable access from the top of the electrical floor box assembly to a low voltage component (not shown) mounted in the funnel.

With reference to FIG. 1, recessed floor box kit 20 is used to install high and/or low voltage components into a conventional electrical floor box 26, such as are available from various manufacturers. Floor boxes 26 are typically constructed of polyvinyl chloride (PVC). The leveling ring 30, funnel 32, and optional low voltage divider 28 are preferably constructed of PVC. Most preferably, each of these elements is molded in one piece of PVC. Trim ring 34, slotted cover 36, and blank cover 100 (see FIG. 13) may be constructed of metal or plastic.

With reference to FIG. 18, there is shown an electrical floor box 26 secured within a concrete pour area 147 with a recessed floor box kit 20 in alignment with the floor box 26. The floor box 26 is preferably sawn off to be flush with the surrounding floor surface. A duplex outlet or receptacle 24 (see FIG. 1) is secured to the leveling ring 30. To operate the invention, the low voltage divider 28 is installed within the electrical floor box. Plug 42 is removed from the funnel 32, a low voltage component (not shown) is inserted within the keystone holder 44, and the keystone holder 44 is inserted into the keystone opening 40 of the funnel. The trim ring 34 and funnel 32 are then secured to the leveling ring 30 by fasteners 181 to create a leveling assembly 167 including the duplex receptacle or electrical outlet 24 (see FIG. 1). The bottom wall 48 of the funnel 32 seals around the periphery of the electrical outlet and, with the sidewalls 38 and 65, form an electrical enclosure within the floor box for enclosing high voltage connections. PVC cement is applied to the outer circumference of leveling ring 30 and the leveling assembly 167 is pressed into the floor box 26. Trim ring 34 establishes contact with the floor surface and positions the leveling assembly 167 level with the floor surface and at the correct depth within the box to make trim ring flush with the floor surface. The sealing surface 144 of the funnel 32 mates with and bears against the top extension 88 of the low voltage divider 28 to provide a low voltage compartment within the electrical floor box. The installation of the recessed floor box kit 20 may then be completed by installing a blank cover 100 and optionally a gasket 149. Alternatively, as shown in FIG. 1, the recessed floor box kit 20 may be finished with a slotted cover 36 to enable the passage of electrical cords (not shown) to the electrical outlet 24 while the outlet is in use.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A recessed floor box kit for mounting an electrical outlet and a low voltage component to a floor box having an enclosure, comprising:
    a divider to divide said enclosure of the floor box into a low voltage enclosure and a high voltage enclosure;
    a leveling ring to mount and level the electrical outlet in alignment with said high voltage enclosure;
    a funnel to mount said low voltage component in alignment with said low voltage enclosure of said floor box;
    a pocket on said funnel, said pocket for snap-in mounting of a low voltage component; and
    a trim ring to secure said funnel to said leveling ring and floor box.

2. The recessed floor box kit of claim 1 comprising:
    a low voltage cavity in said funnel, said low voltage cavity to receive snap-in connection of a keystone holder:
    a recessed surface on said trim ring; and
    a cut-out area on the recessed surface of the trim ring, said cut-out area providing access from the top of the floor box to the low voltage component.

3. The recessed floor box kit of claim 2 comprising a rail in said funnel, said rail to support said keystone holder.

4. The recessed floor box kit of claim 3 comprising a keystone opening in said funnel, said keystone opening to allow access to said cavity and said keystone holder.

5. The recessed floor box kit of claim 2 comprising a recessed surface on said trim ring, said recessed surface including apertures to accept one or more fasteners for securing said trim ring.

6. The recessed floor box kit of claim 4 comprising a plug to close said keystone opening.

7. The recessed floor box kit of claim 3 comprising a planar lip on said keystone holder, said planar lip to engage said rail of said funnel.

8. The recessed floor box kit of claim 1 comprising a flange on said trim ring, said flange to cover said floor box and a portion of the floor.

9. The recessed floor box kit of claim 1 comprising:
    an opening in said trim ring;
    a snap cap to close said opening in said trim ring; and
    a slot in said snap cap to pass one or more electrical cords there through.

10. The recessed floor box kit of claim 9 comprising:
    one or more resilient legs on said snap cap; and
    one or more posts on said snap cap.

11. The recessed floor box kit of claim 10 comprising a tab on said one or more legs of said snap cap.

* * * * *